US012632436B1

(12) United States Patent
Tracey et al.

(10) Patent No.: US 12,632,436 B1
(45) Date of Patent: May 19, 2026

(54) ADAPTIVE INDEXING SYSTEM THAT DYNAMICALLY SELECTS INDEX KEYS BASED ON OBSERVED QUERY STATISTICS

(71) Applicant: Rapid7, Inc., Boston, MA (US)

(72) Inventors: David Tracey, Monasterboice (IE); Seamus Cawley, Dublin (IE)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 18/809,526

(22) Filed: Aug. 20, 2024

(51) Int. Cl.
 *G06F 16/22* (2019.01)
 *G06F 16/21* (2019.01)
 *G06F 16/2453* (2019.01)

(52) U.S. Cl.
 CPC ........ *G06F 16/2272* (2019.01); *G06F 16/217* (2019.01); *G06F 16/2453* (2019.01)

(58) Field of Classification Search
 CPC . G06F 16/2272; G06F 16/217; G06F 16/2453
 See application file for complete search history.

(56) References Cited

U.S. PATENT DOCUMENTS 11,334,548 B2 5/2022 Kuimelis et al.
2019/0334857 A1* 10/2019 Tanaya ................ H04L 61/4523

2020/0117637 A1* 4/2020 Roy ...................... G06F 16/137
2020/0265098 A1* 8/2020 Tepper ................... G06F 18/22
2021/0089508 A1* 3/2021 Laskawiec ............ G06F 16/215
2021/0294807 A1* 9/2021 Fu ........................ G06F 16/9027
2022/0335068 A1* 10/2022 Yue ....................... G06F 16/285
2023/0229659 A1* 7/2023 Beresniewicz ..... G06F 11/3409
 707/718

* cited by examiner

*Primary Examiner* — Huawen A Peng
(74) *Attorney, Agent, or Firm* — Ashwin Anand; Lei Sun

(57) ABSTRACT

Systems and methods are disclosed to implement an adaptive indexing system for a data store that dynamically selects which query keys to include in the index based on observed query statistics of the data store. In embodiments, the system monitors the query statistics to determine when a query key exceeds a usage threshold, and then dynamically adds the query key to the index. The addition causes subsequent data to be indexed by the query key, and may also cause a reindexing of existing data in the data store, for example a recent window of data selected based on the query statistics. In embodiments, the index is repeatedly modified to continuously adapt the index to changing querying patterns. Advantageously, the disclosed system autonomously selects a small set of the most frequently used query keys in the index, which limits the size of the index without sacrificing query performance.

20 Claims, 9 Drawing Sheets

*data storage system 100*

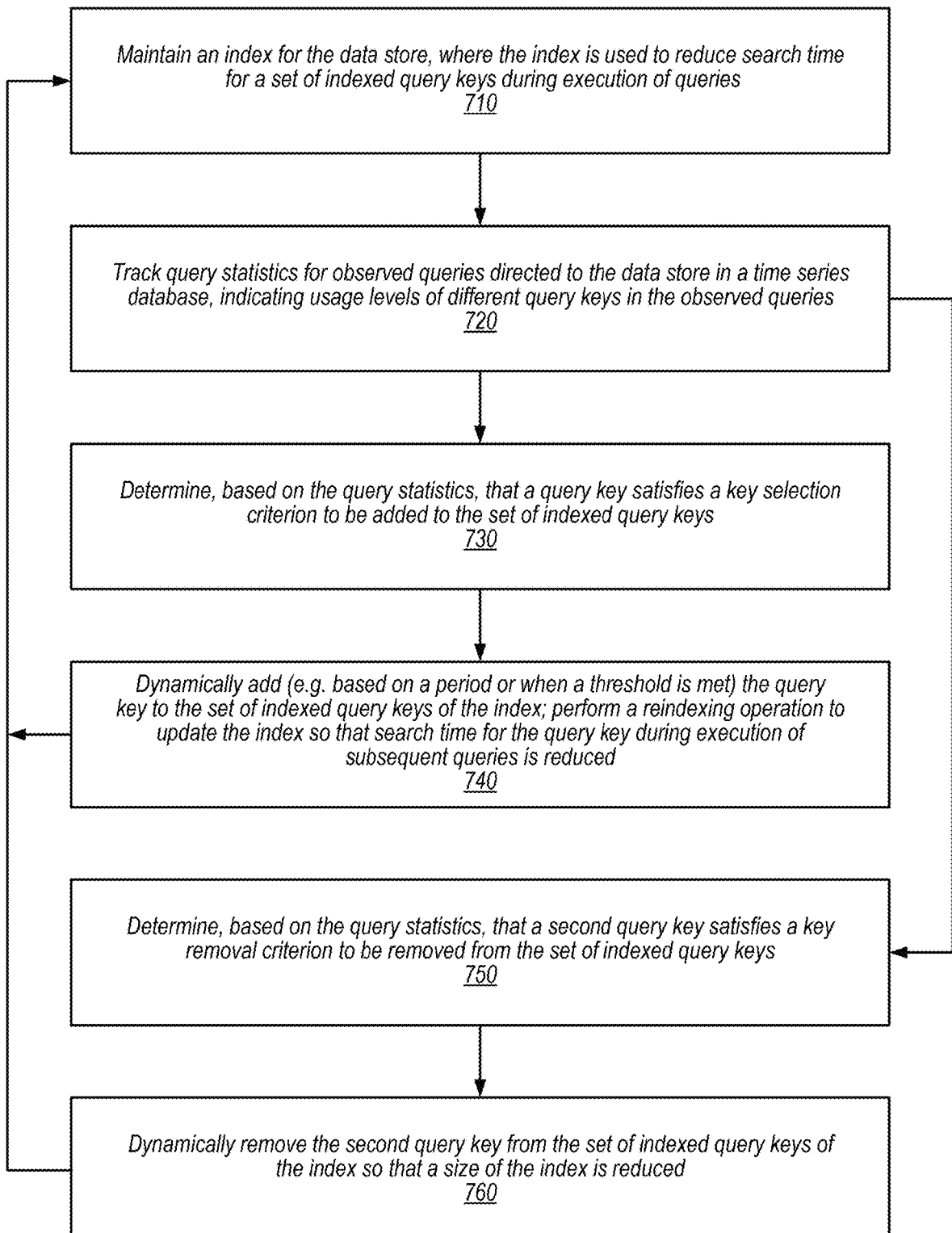

Maintain an index for the data store, where the index is used to reduce search time for a set of indexed query keys during execution of queries
710

Track query statistics for observed queries directed to the data store in a time series database, indicating usage levels of different query keys in the observed queries
720

Determine, based on the query statistics, that a query key satisfies a key selection criterion to be added to the set of indexed query keys
730

Dynamically add (e.g. based on a period or when a threshold is met) the query key to the set of indexed query keys of the index; perform a reindexing operation to update the index so that search time for the query key during execution of subsequent queries is reduced
740

Determine, based on the query statistics, that a second query key satisfies a key removal criterion to be removed from the set of indexed query keys
750

Dynamically remove the second query key from the set of indexed query keys of the index so that a size of the index is reduced
760

FIG. 7

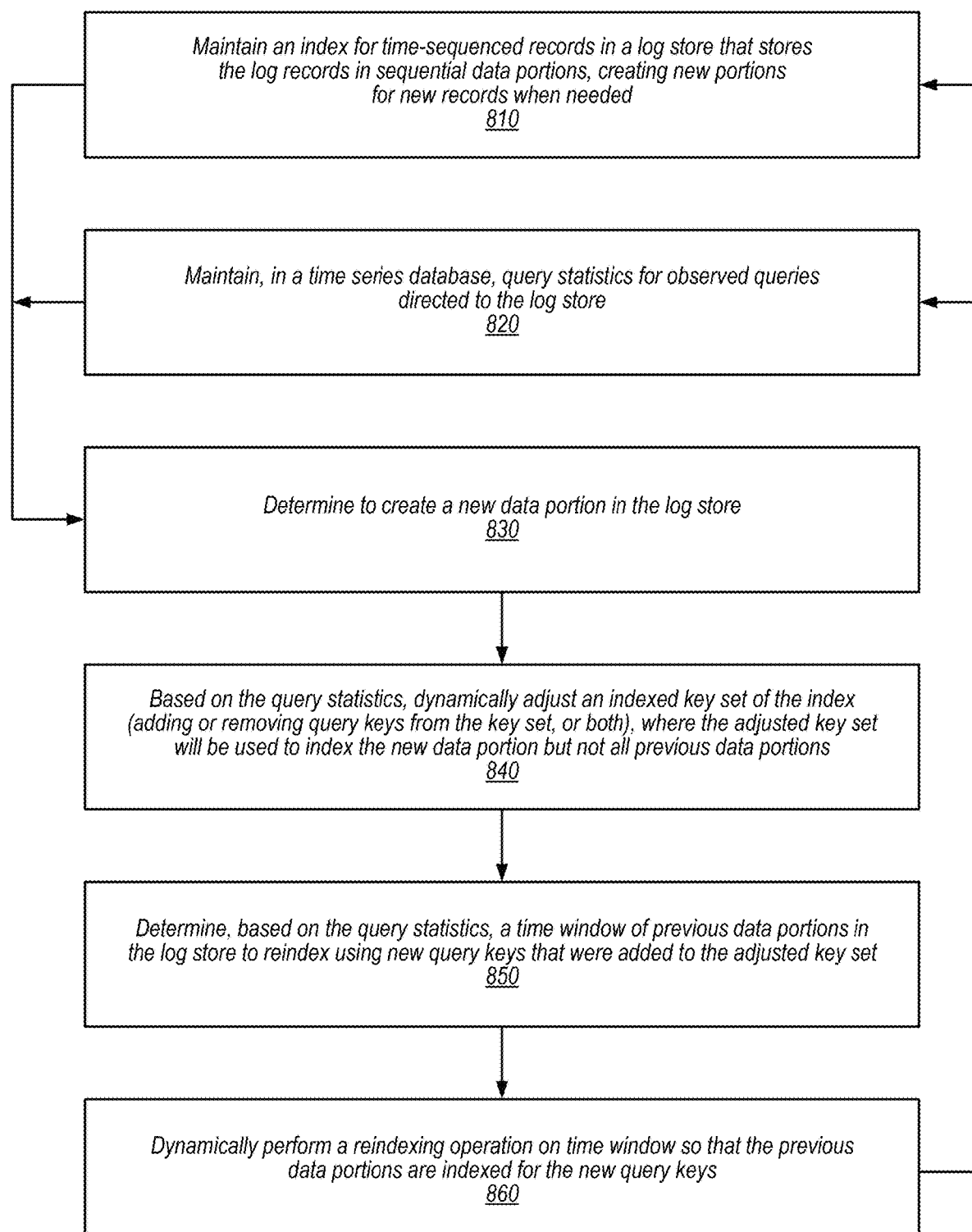

Maintain an index for time-sequenced records in a log store that stores
the log records in sequential data portions, creating new portions
for new records when needed
810

Maintain, in a time series database, query statistics for observed queries
directed to the log store
820

Determine to create a new data portion in the log store
830

Based on the query statistics, dynamically adjust an indexed key set of the index
(adding or removing query keys from the key set, or both), where the adjusted key set
will be used to index the new data portion but not all previous data portions
840

Determine, based on the query statistics, a time window of previous data portions in
the log store to reindex using new query keys that were added to the adjusted key set
850

Dynamically perform a reindexing operation on time window so that the previous
data portions are indexed for the new query keys
860

FIG. 8

ADAPTIVE INDEXING SYSTEM THAT DYNAMICALLY SELECTS INDEX KEYS BASED ON OBSERVED QUERY STATISTICS

BACKGROUND

Indexing is a commonly used technique in database systems to speed up the execution of queries. An index improves query response time by reducing the number of locations that needs to be searched on persistent storage (e.g. number of files or blocks that the query engine needs to scan), in the absence of an index. Hence, the initial decision as to what to index and how indexing should be implemented over the data can have significant impacts on database performance. Part of the decision involves an a priori understanding what the query and data access patterns will look like for the dataset. For example, the primary key for a table in a relational database (which uniquely identifies each row in a table) is usually indexed because it is expected to be heavily used in queries on the table.

Indexes do, however, require storage space in addition to the actual data to be stored. The cost of this additional storage means that it is not feasible generally to index every key that may be in the data. Some types of indexing systems employ techniques to reduce the number of keys used to index the data. However, current strategies are generally associated with various drawbacks, and typically rely on an imperfect assumption of what the actual querying patterns of the database will be. As a result, these indexing systems will often either over-index a dataset (leading to a waste of storage space) or under-index the dataset (leading to poor querying performance). Improved indexing techniques are needed to address these and related technical challenges in the state of the art.

BRIEF DESCRIPTION OF THE DRAWINGS

FIG. 7 is a flowchart illustrating a process performed by a data storage system to manage and use an adaptive index, according to some embodiments.

FIG. 8 is a flowchart illustrating a process performed by a time-sequenced data store that uses an adaptive index to selectively index data in a time-sequenced dataset, according to some embodiments.

Figure 1:
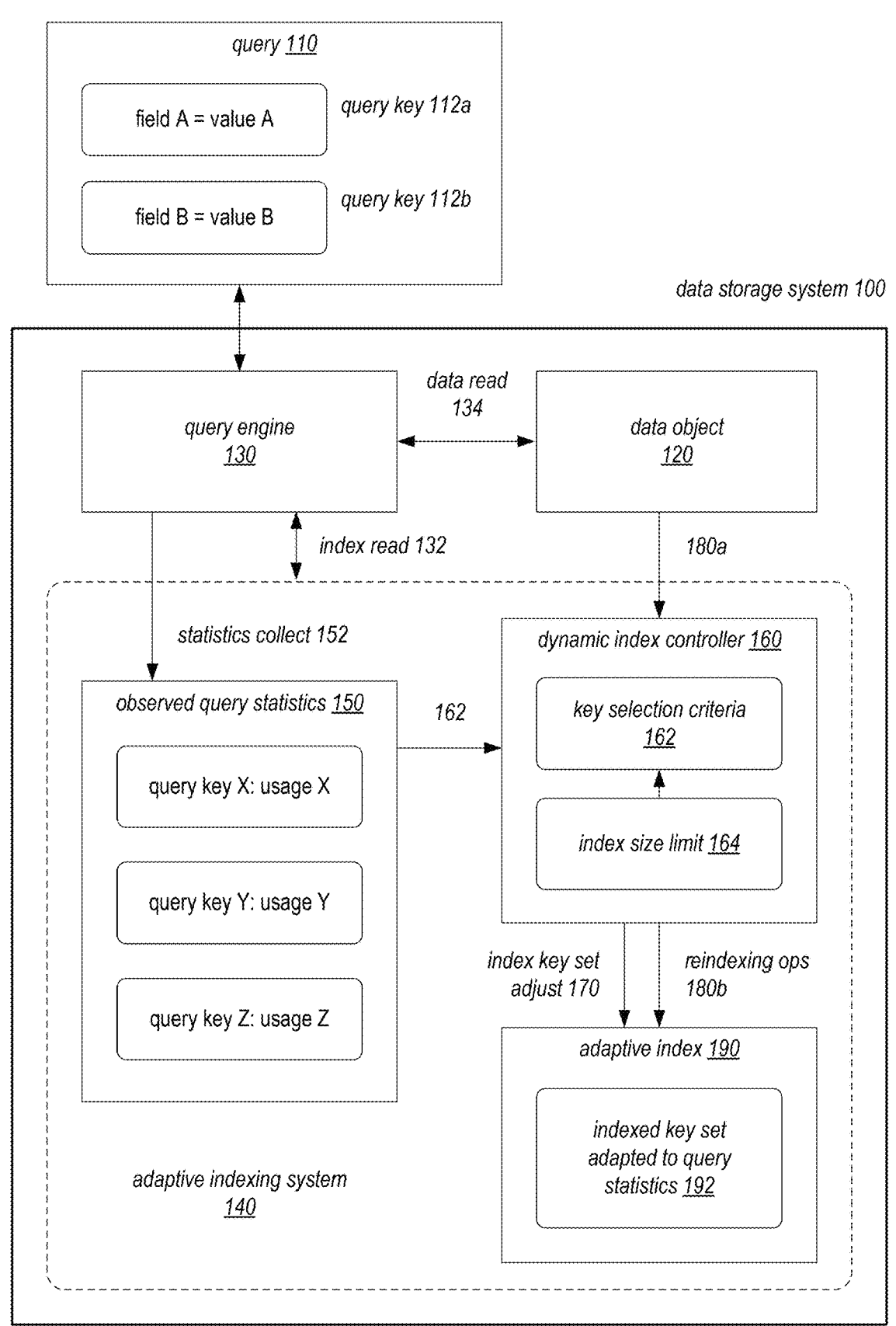
FIG. 1 is a block diagram illustrating a data storage system that implements an adaptive indexing system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Indexes are used in modern database systems to speed up the execution of queries. Common indexing techniques include B-trees, inverted indexes, Bloom filters, and hash tables, among others. These indexing techniques provide various tradeoffs in terms of speed of lookup, cost of maintenance, cost of storage, the ability to provide deterministic results (e.g., as opposed to probabilistic results that can include the possibility of false positives), etc. At database design time, the decision as to what to index and how indexing should be implemented can have significant impacts on database performance. Proper indexing design requires an a priori understanding of what the query and data access patterns will look like for the dataset.

However, indexing is associated with added storage costs. The cost of additional storage for indexes means that it is not generally feasible or desirable to index every query key that may be in the dataset. Indexing strategies are typically selected manually by database owners, who must rely on an imperfect assumption of what the actual querying patterns of the database will be. As a result, these indexing choices will often over-index a dataset (leading to a waste of storage space) or under-index the dataset (leading to poor querying performance). Moreover, many current database systems require that the index be maintained for the entirety of the dataset. This design restriction is highly inefficient for certain types of datasets, where querying is predictably focused on just a small portion of the dataset.

To address these and other types of challenges in state-of-the-art database systems, this application discloses embodiments of an adaptive indexing system that dynamically selects which query keys to include in the index based on observed query statistics of the data store. In some embodiments, the adaptive indexing system monitors the query statistics of the data store or a particular data object. When usage of a query key (e.g. username=dtracey) exceeds a threshold, the system will dynamically add the query key to the index, so that subsequent changes to the data object are indexed based on the query key. In some embodiments, the index will be repeatedly adjusted in this manner to continuously adapt the index to the observed querying patterns of the data. In some embodiments, the adaptive index may be limited to a particular size (e.g. a maximum number of query keys), so that only the most highly-used query keys are kept by the index.

As may be understood by those skilled in the art, the level of usage of a particular query key may not be known in advance of the index design, and may also change over time after the index is created. To address this problem, the adaptive indexing system allows for subsequent adjustments to the index by automatically selecting keys to be indexed, periodically based on their recent usage statistics. Thus, the adaptive indexing system dynamically adapts to the queries being performed on the data and is not fixed to the design choices made when the index was initially created. Moreover, the adaptive indexing system can be configured to always maintain a "best" set of query keys to index, in order to keep the index to a storage or size limit. This storage management approach overcomes many of the limitations of space-efficient probabilistic structures (e.g. Bloom filters), which can only provide probabilistic search results. Additionally, embodiments of the adaptive indexing system can be programmatically tuned based on the available storage for the index (e.g. expand or shrink the indexed key set as appropriate), making the index dynamically adaptable to a variety of runtime environment conditions.

In some embodiments, the adaptive indexing system employs a time series database to store collected usage statistics of individual query keys. The usage statistics for individual query keys may initially be stored as raw query events with associated timestamps, and then aggregated into statistical data (e.g. counts, frequencies, or rankings) in regular time intervals. In some embodiments, the usage statistics may also include an observed usage cost for individual query keys, such as the search time expended to evaluate a query key or an amount of the data searched using the query key. In some embodiments, each time interval may indicate what query keys were observed during the interval, and their usage statistics during that period. The usage statistics may be used to calculate a usage metric for each query key (e.g. usage frequency weighed by usage cost). Those query keys whose usage metric exceed a usage threshold in the last time interval may be dynamically added to the index. In some embodiments, when a query key is added to the index, a lesser-used query key may be evicted from the index. In some embodiments, each query key in the indexed key set will automatically "expire" after a configured life period that can be tuned according to the total number of queries and/or the size of the time series database.

In some embodiments, the data may be stored in a number of fragments (e.g. individual blocks, partitions, or files), and the adaptive index may maintain different key sets for different fragments. A search data structure (e.g. a hash index) may be maintained for each fragment. The search data structure is updated whenever the data fragment is changed (e.g. when data is added to or removed from the fragment), or during a reindexing operation. Unlike static indexing systems, the query keys maintained in the search structure are adjusted periodically based on usage statistics for keys. In some embodiments, the storage size of the hash index is controlled by only adding keys that have appeared in a configurable percentage of queries in a last observation period.

In some embodiments, at query execution time, the query engine will check whether individual query keys in the query appear in the search data structure of individual fragments. If a query key appears in the search structure for a fragment, the query engine may perform a more thorough scan of the fragment to fetch data records matched by the query key. If the query key does not appear in the search structure, that particular fragment can be skipped. In some embodiments, the search data structure may indicate the actual locations of matching data records in the data fragment, so that these records can be fetched directly without a scan of the fragment.

In some embodiments, the adaptive indexing system may implement a multi-level index where a chain of search data structures is used to index the data. During search time, the search structures in the chain are evaluated in sequence, so that if a query key is not indexed by a first search structure, the next search structure in the chain is examined. Such chaining may be used to implement an adaptive index that supports different levels of adaptation policies, for example, a first level of indexing that adapts to the querying pattern of a broader user group, and a second level that adapts to a specific user. In some embodiments, a Bloom filter search structure may be used as a last search structure in the chain, to provide a probabilistic lookup result if a query key is not indexed by any previous search structures in the chain. In some embodiments, the Bloom filter is always used as a search structure in the index because it is a highly space-efficient data structure with relatively small storage requirements.

In some embodiments, the dataset indexed by the adaptive indexing system may be part of a log store, where data records are timestamped and stored in a time sequenced order. In some embodiments, the log store may create data fragments sequentially to correspond to successive time periods associated with the data (e.g. an event log where each day of event data is stored in a separate file). In such embodiments, a change to the indexed key set of the adaptive index may be applied only to future fragments, where most of the querying is expected to focus on. In some embodiments, a selected number of past fragments (e.g. last seven days of event data) may also be reindexed using the adjusted index key set, so that queries directed to this recent window of past data can also benefit from the changed key set. In some embodiments, the size of the backward-looking window for reindexing can be dynamically determined based on the collected query statistics.

As may be appreciated by those skilled in the art, embodiments of the adaptive indexing system as described herein provides many technical advantages over existing database systems of the state of the art, to improve upon the functioning of these database systems. These and other features and benefits of the adaptive indexing system are described in detail below, in connection with the figures.

FIG. 1 is a block diagram illustrating a data storage system 100 that implements an adaptive indexing system 140, according to some embodiments.

As shown, data storage system 100 (e.g. a database system) is configured to store a data object 120 (e.g. a table or a log) which can be searched via a user-formulated query 110. The query 110 may be specified in a query language such as Structured Query Language (SQL), an application programming interface (API) call, or through a graphical user interface (GUI). The query 110 may specify a number of search conditions, which are represented as queries keys 112a and 112b.

As shown in this example, an individual query key 112 in the query may specify a single data field of the data object 120 and a search value for the data field. However, in other embodiments, the query key 112 may encode other types of search criteria that can be indexed by the data storage system 100. For example, in some embodiments, a query key 112 may specify multiple field-value pairs. In some embodiments, the query key 112 may specify a range of values for a particular field. In some embodiments, the query key 112 may correspond to a query predicate of the query, which can include a list of several search conditions.

As shown, query 110 is processed by a query engine 130 of the data storage system 100 to return matching data records from the data object 120. To execute the query, the query engine 130 will first perform an index read 132 on the adaptive indexing system 140 of the data store, and then use the results of the index read 132 to perform a data read 134 on the data object 120. If a query key 112 is indexed by the adaptive indexing system 140, the data read 134 can be performed much more quickly (e.g. by skipping some portions of the data object during the data read or avoiding a full scan of the data object).

As shown, the adaptive indexing system 140 includes several components 150, 160, and 190. The observed query statistics 150 may be a data store used to store query statistics collected 152 from the query engine 130. In some embodiments, the query statistics data store 150 may be implemented as part of the data storage system 100 itself. In some embodiments, the observed query statistics store 150 is a time series database, where observations are time-stamped and stored in a time-sequenced order. The time series database may aggregate or group the statistical data into a series of time slots or observation periods, which may be regular time intervals. The query statistics 150 may indicate, for each time interval, which query keys were observed against the data object (here query keys X, Y, and Z), and an observed usage statistic of these query keys for every observation period. The usage statistic may take a variety of forms, including a count or frequency of a query key, a percentage or share of queries that used the query key, or a usage rank of the query among other query keys. In some embodiments, the usage statistic may indicate a detected change in the usage of a query key (e.g. an abnormal jump in the observed count of the key when compared to previous periods). In some embodiments, the data storage system 100 may manage multiple instances of the data object 120, which may be used to store data of different clients. The query statistics 150 may reflect statistics collected from another instance of the data object, so that the indexing of data object 120 is adjusted based on the querying patterns of the other instances.

As shown, the query statistics 150 is read 162 by the dynamic index controller 160 and used to make adjustment decisions on the adaptive index 190 of the data object 190. The adjustment 170 on the index 190 may be made repeatedly, either periodically or in response to configured conditions (e.g. when a performance level of the indexing system 140 degrades past a certain point). In some embodiments, the dynamic index controller 160 implements one or more key selection criteria 162, which determines what query keys are to be included in the indexed key set 192 of the adaptive index 190. The key selection criteria 162 may be a configurable policy that takes into account a specified size limit 164 of the index 190, which may allow only a maximum number of query keys to be indexed or limit the index to a maximum storage size.

In some embodiments, the key selection criteria 162 may also specify a key removal criterion that determines when a query key is removed from the indexed key set 192. For example, a query key may be evicted from the indexed key set 192 if its usage level drops below a certain threshold. In some embodiments, each query key in the indexed key set 192 may be associated with a life period, and an individual query key will be "retired" from the indexed key set upon expiration of its life period. In some embodiments, the length of this life period may be determined dynamically based on the observed query statistics 150, for example, based on a magnitude of an initial usage spike that caused the query key to be added to the indexed key set, or based on historical usage patterns of the query key deduced from the query statistics. In some embodiments, the adjustment decisions of the dynamic index controller 160 may be made by one or more machine learning models that are trained to recognize change conditions in query statistics 150.

As shown, once an adjustment decision is made by the index controller 160, an actual adjustment 170 of the index key set will be performed on the index. The adjustment 170 may take effect or be performed immediately when the adjustment decision is made, or scheduled to occur at a later time (e.g. according to a regular cadence or during a window of low data store activity). In some embodiments, the current indexed key set 192 of the adaptive index 190 may be recorded as part of the metadata of the index 190, which may be stored on persistent storage or maintained purely in volatile memory.

In some embodiments, the index key set adjustment 170 will only be applied to and affect new data stored to the data object, so that older data are not reindexed. In other embodiments, the adjustment to the indexed key set 192 will be accompanied by a reindexing operation 180, which reexamines 180a the data object to update 180b the index for at least a portion of the older data for the adjusted key set of the index. Because the reindexing operation 180 may a resource-intensive operation, it may be performed asynchronously from the index key set adjustment 170, and may be schedule to occur at a time that will not cause excessive impacts on data storage system's normal operations (e.g. during a housekeeping period of the data object where client access is disallowed).

Figure 2:
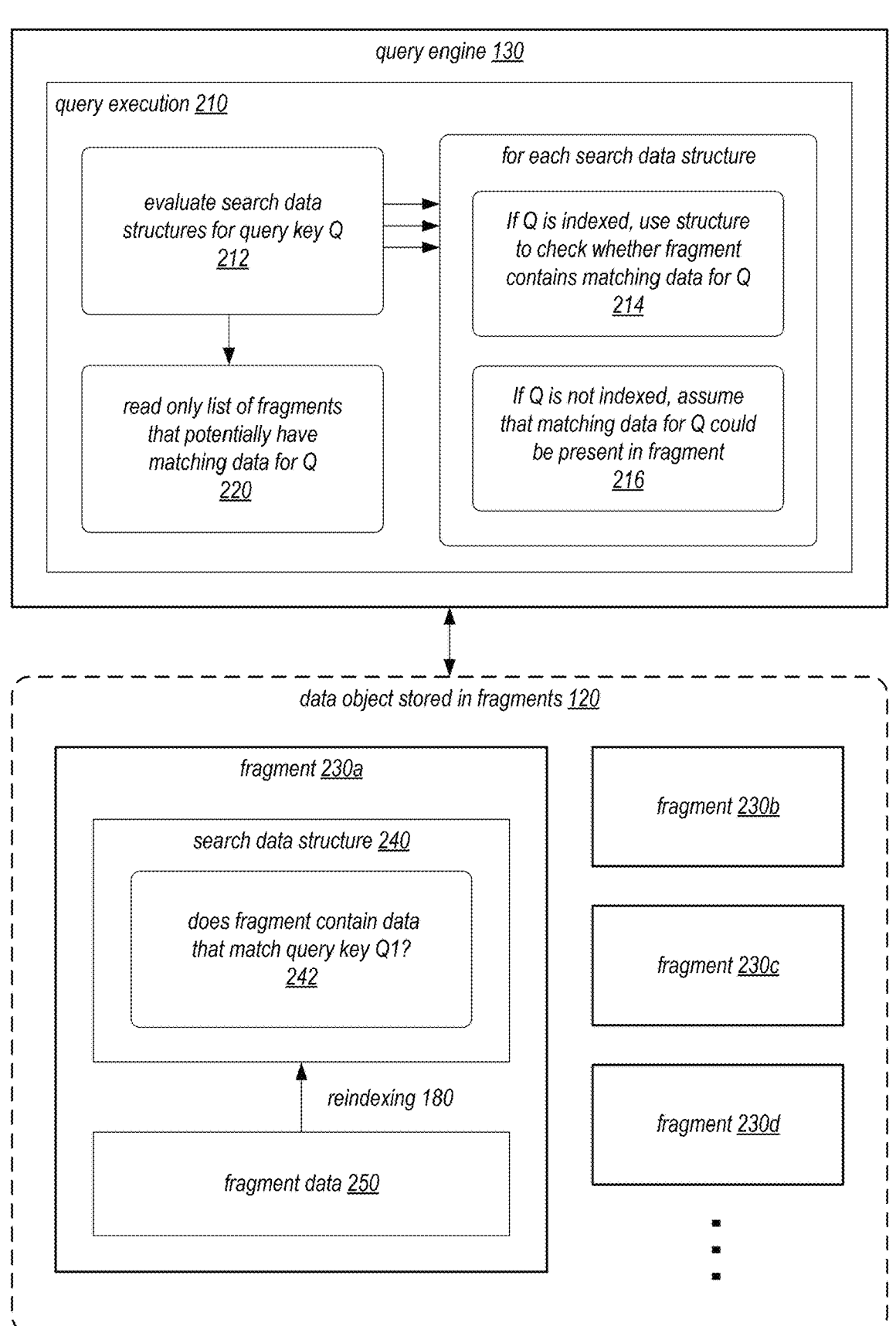
FIG. 2 is a block diagram illustrating a query engine using search data structures of an adaptive indexing system during query execution, according to some embodiments.

FIG. 2 is a block diagram illustrating a query engine 130 using search data structures 240 of an adaptive indexing system during query execution, according to some embodiments.

As shown, in this example, the data object 120 is stored in a number of fragments 230a-d. In various embodiments, these fragments 230 may be distinct portions of the data object, such as distinct sets of data blocks, data files, independently managed partitions, or the like. Each fragment (e.g. fragment 230a) will have an individual search data structure 240, which is part of the adaptive index and will be evaluated to determine whether a fragment needs to be read or scanned during query execution. In one embodiment, each fragment 230 is comprised of a set of three files: a data file that contains the stored data of the fragment arranged in blocks (e.g. fragment data 250), an index file that implements the search data structure 240, and a map file that indicates additional metadata about the fragment (not shown).

As shown, during a query execution 210 for a query that specifies a query key Q, the search engine 130 will evaluate 212 the search data structures 240 of all fragments to determine which fragment needs to be read or scanned for a query key Q. In some embodiments, the evaluation first checks the search data structure 240 to determine whether query key Q is indexed (e.g. included as part of the indexed key set). In some embodiments, the indexed key set may be different for different fragments.

If the query key Q is indexed in the search data structure 240, at operation 214, the search data structure is checked to determine whether the fragment data 250 associated with the search data structure contains matching data for the query key Q. Based on the result of this check, the fragment is either included in or excluded from a list of fragments to read for the query, in operation 220. Because the search data structures 240 will indicate that some fragments do not have matching data for the query key, these fragments can be eliminated from further query processing, thus allowing the query to be completed more quickly. As shown, for fragments where Q is not indexed, at operation 216, the query engine 130 may simply assume that data potentially matching Q is present in the fragment, so that these fragments are read for the query.

As discussed, if the adaptive indexing system observes many searches of query key Q on a fragment that is not indexed for Q, the indexing system may choose to include the query key in the indexed key set for that fragment, so that future searches of the fragment using query key Q can be executed more quickly.

It is noted that the precise implementation of the search data structures 240 can vary based on the embodiment. In some embodiments, the data 250 of each fragment may be an individual file, and the search data structure 240 may be a corresponding metadata file. In some embodiments, the search data structure 240 may be stored as part of the fragment data file, for example, in a header portion of the fragment data file. In some embodiments, the search data structure 240 may be a metadata file that corresponds to multiple fragment data files. In some embodiments, the fragment data file may be organized in separate blocks, and the search data structure 240 points to a list of blocks that contain matching records for the query key.

As discussed, in some embodiments, different fragments in the data object may be associated with different sets of indexed keys. Thus, for example, the query statistics 150 collected for the data object 120 may contain per-fragment usage data in some embodiments, so that the adaptation adjustment decisions of index controller 160 can be made on a per-fragment basis. In this manner, the adaptive index can be configured to focus indexing efforts on those portions of the data object that are more heavily read by queries.

In some embodiments, the reindexing operation 180 may be "piggybacked" on the query execution. Thus, for example, if it was decided that query key Q should be indexed for a fragment 230a, the results of query execution 210 (performing a full scan of fragment 230a) can be recorded in the search data structure 240. In this way, the reindexing operation 180 will simply be performed as part of query execution 210, and does not have to be independently repeated at a later time.

Figure 3:
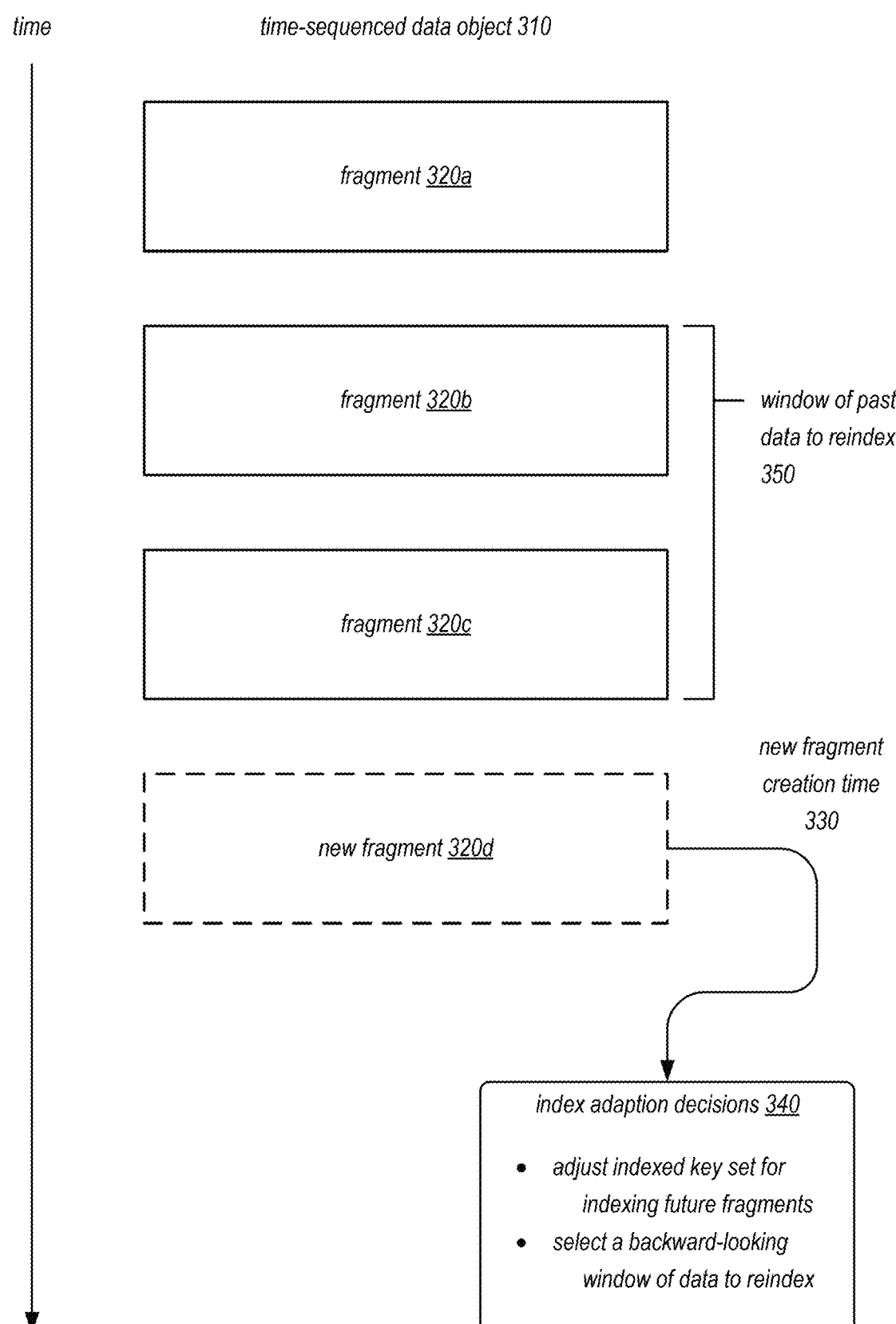
FIG. 3 illustrates a time-sequence data object and how an adaptive indexing system indexes fragments of the time-sequence data object, according to some embodiments.

FIG. 3 illustrates a time-sequence data object 310 and how an adaptive indexing system 140 indexes fragments of the time-sequence data object, according to some embodiments. The time-sequenced data object 310 is an embodiment of data object 120, discussed in connection with FIGS. 1 and 2.

As shown, in this type of data object 310, the data is stored in fragments 320a-d that are time-sequenced. The data records in the fragments 320 may also be timestamped and stored in time order. As an example, time-sequenced data object 310 may be an event log, where individual events are stored in time order, and the fragments 320 represents successive weeks, days, or hours of event data. As shown, as new data arrives for the data object 310, the data store may occasionally create a new fragment 320d to store the new data.

In some embodiments, the index adaptation decisions 340 for the time-sequence data object 310 may be made every time a new fragment is created 330. The indexed key set is adjusted as part of the index adaptation decisions 340, and the adjusted indexed key set may not apply to all previous fragments before new fragment 320d. This approach is used in some embodiments because it is known that historical data in the data object will not be heavily queried, if at all. Thus, the indexing system will not waste resources to reindex the data in previous fragments 320a-c.

In some embodiments, the adaptive index system will also selectively determine a back-ward looking window of data to reindex. This extra step may be useful in some situations where some querying for recent data is still anticipated. To improve the performance of such queries, a limited window of recent data fragments is reindexed according to the adjusted index key set. As shown, in this example, the reindex window 350 encompasses the last two fragments of the data object before the new fragment 320d. The size of the reindexing window 350 may be determined based on the collected query statistics. For example, if observations of a new query key began in an earlier fragment 320b, that earlier fragment will be included in the reindexing window 350.

Figure 4:
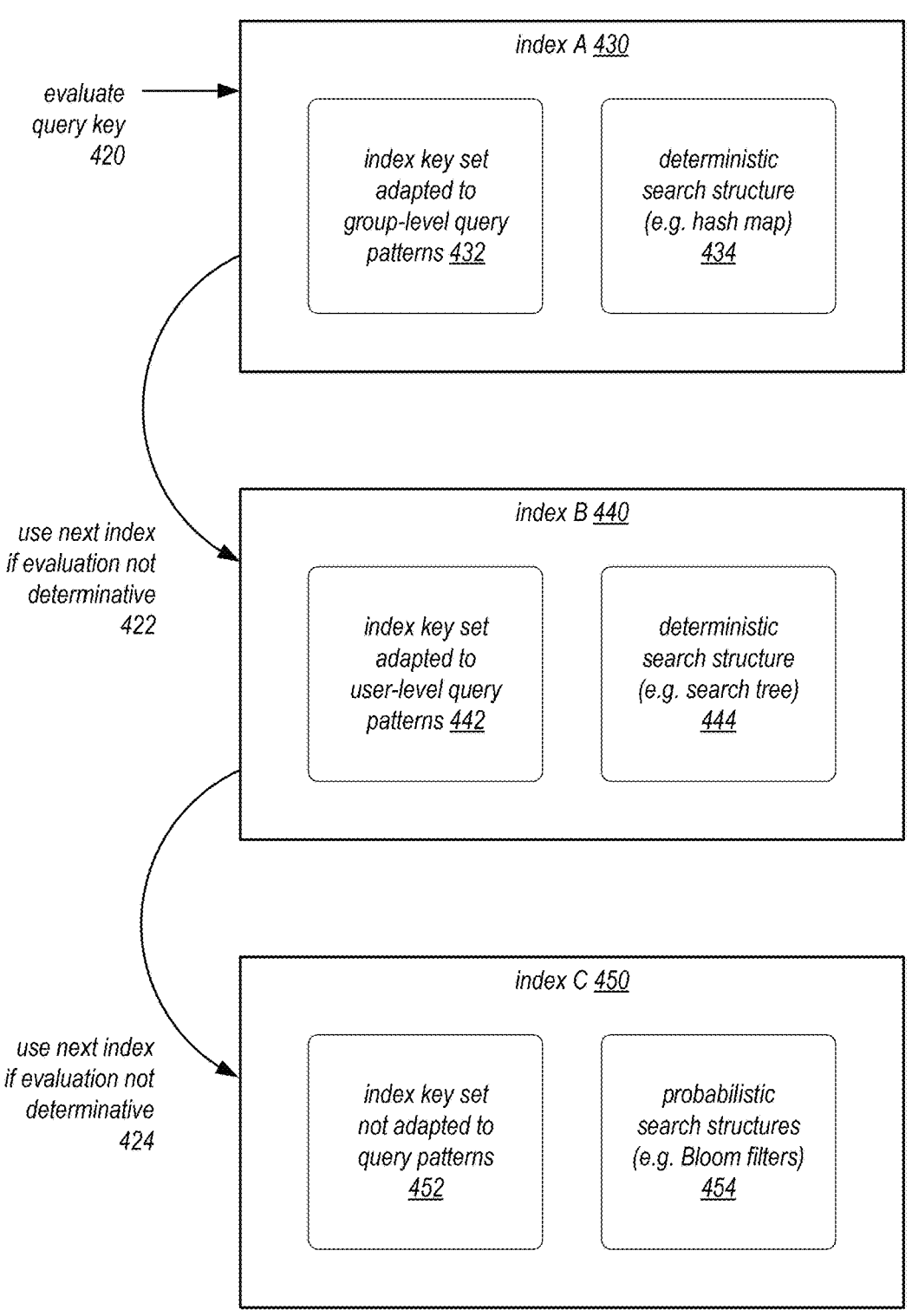
FIG. 4 illustrates a chaining of multiple adaptive indexes in an adaptive indexing system, according to some embodiments.

FIG. 4 illustrates a chaining of multiple adaptive indexes 420 and 422 in an adaptive indexing system 140, according to some embodiments.

As shown in this example, the chained index 410 employs multiple indexes chained in a sequence. Each of the indexes A 430, B 440, and C 450 may maintain its own set of indexed keys. Thus, during a query execution that searches for a query key, the query engine may first evaluate 420 index A for the query key. If the evaluation of index A is not determinative (e.g. because the key is not indexed by index A), then the next index in the chain (index B) is evaluated 422. If the evaluation of index B is still not determinative, then index C is evaluated 424. In general, the index chain 410 can be of any length, and each index in the chain can add an additional set of indexed query keys to the index.

In various embodiments, the indexes 430, 440, and 450 can be of different index implementations, and also use different adaptation policies. For example, index A in this case is implemented by a deterministic search structure 434 such as a hash map. Index A is configured to adapt to the group-level query patterns 432 of a user group. Index B in this case is implemented by another deterministic data structure 444 such as a search tree. The indexed key set of index B is adapted to the user-level query patterns 442 of a particular user. Finally, index C is implemented as a probabilistic data structure 454, such as a Bloom filter. In this example, index C is not adapted 452 to any query usage statistics, and simply indexes a set of pre-configured query keys.

In some embodiments, different fragments of a data object may implement different chains of indexes. In some embodiments, the composition and/or ordering of the index chain 410 may be configured dynamically based on observed query execution statistics. For example, if a particular component index of the chain is highly determinative for the overall evaluation of the index, it may be moved up in the chain so that it is evaluated earlier. In some embodiments, the individual query keys may migrate up and down the chain depending on their observed usage statistics.

Figure 5:
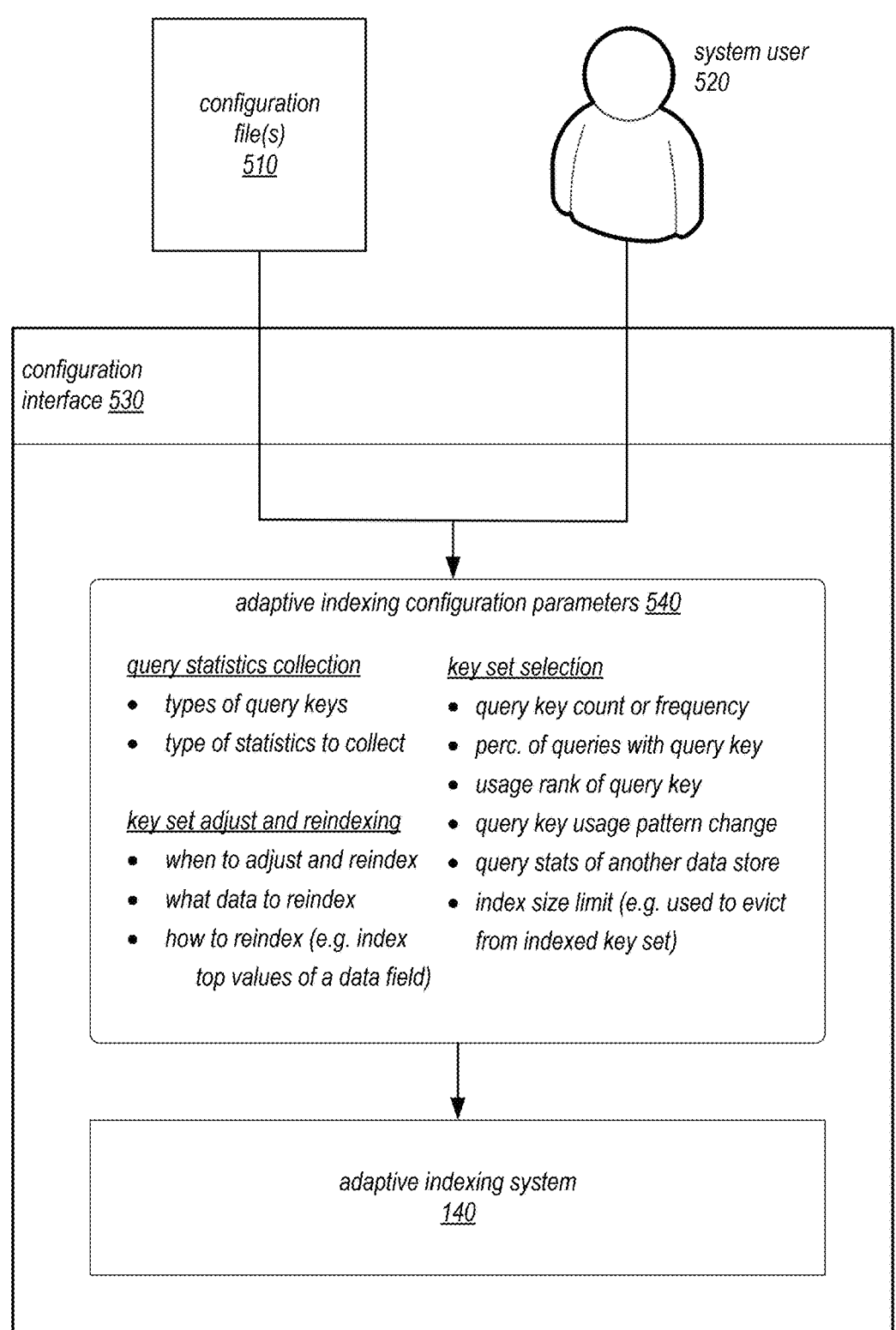
FIG. 5 illustrates various configuration parameters of an adaptive indexing system, according to some embodiments.

FIG. 5 illustrates various configuration parameters 540 of an adaptive indexing system 140, according to some embodiments.

As shown, the data storage system 100 in this example implements a configuration interface 530 for the adaptive indexing system 140 that allows users to configure the behavior of the adaptive indexing system. The configuration interface 530 may be an interactive user interface such as a command line interface (CLI) or GUI that can receive configuration input from a system user 520. The configuration interface 530 may also be a programmatic interface such as an API. In some embodiments, system configuration parameters 540 may be specified in a configuration file 510 or stored in some other type of configuration data storage, which can be read by the system's control plane components to control the system's operations.

As shown, in some embodiments, the configuration parameters 540 may control what types of query keys are to be monitored by the adaptive indexing system. For example, the configuration parameters may specify that certain types of query keys should never be indexed and their usage statistics should not be collected. The configuration parameters may also specify what types of statistics are to be collected by the indexing system. For example, the configuration parameter may indicate the length of the time interval for computing the query key statistics. As another example, the configuration parameters may specify to collect the byte size of observed query keys. This information may be used as part of the key selection criteria, where smaller query keys are preferred over larger query keys, for example.

As shown, the configuration parameters 540 may also specify the indexed key set selection criteria of the adaptive indexing system. The selection criteria may be based on various aspects of the query key statistics, such as observed key count or frequency over a specified time interval, the percentage or share of queries that used a particular query key, a usage rank of the query key, etc. The configuration parameters may also define a type of change in the usage pattern of a query key, which will cause that query key to be placed in the indexed key set. Such a change may be, for example, a sudden or unexpected increase in the usage of a query key. In some embodiments, the key selection criteria may be based on observed query key statistics of another data store (which may have a common schema with the indexed data store). For example, some data storage systems may manage a number of data stores for different clients, and the query key usage data of a first client data store may cause an index change in a second client data store. Finally, in some embodiments, the configuration parameters may also specify an index size limit for the index (e.g. a maximum number of query keys or a byte size of the index). When the size limit of the index is exceeded, the adaptive indexing system will use a key removal criteria to selectively evict query keys from its indexed key set.

As shown, the configuration parameters 540 may further include parameters that control the key set adjustment and reindexing operations of the adaptive indexing system. For example, the control parameters may specify when a key set adjustment or reindexing operation should be performed (e.g., at regular time intervals, at a scheduled time, when new fragments are created, or upon the occurrence of certain triggering conditions). In some embodiments, resource-intensive operations such as reindexing operations may be scheduled to occur during a low-activity time of the data storage system.

In some embodiments, configuration parameters for the reindexing operation may specify what data will be reindexed. For example, the indexing system may be configured to reindex by creating a new or updated index for only some fragments of a data object (e.g. based on per-fragment query statistics). In the case of a time-based log store, the reindexed fragments may be selected based on time, for example, to implement a dynamically tuned backward-looking reindexing window, as discussed in connection with FIG. 3.

In some embodiments, the configuration parameters for the reindexing operation may specify how a reindexing operation is performed. For example, in some cases when a particular query key (e.g. username=scawley) is added to the index, the indexing system may be configured to also add other query keys involving the same data field to the index (e.g. username=dtracey). Depending on the number of distinct values that exist for the data field in the data, all values may be added to the index, or just a subset of the top queried-for values.

Figure 6:
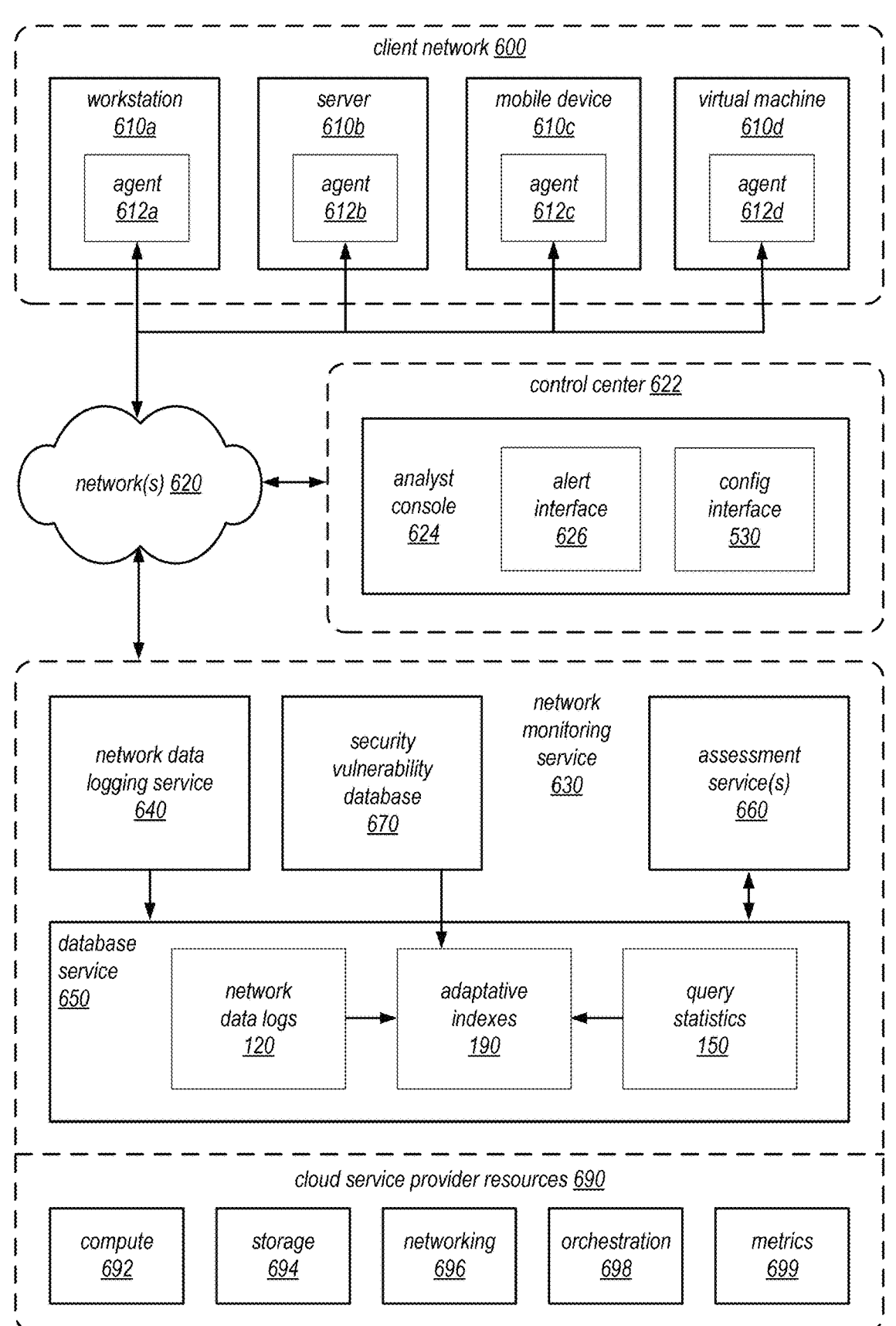
FIG. 6 a network monitoring service configured to monitor client networks for security threats and/or incidents, which uses adaptive indexes to index network data logs, according to some embodiments.

FIG. 6 a network monitoring service 630 configured to monitor client networks 600 for security threats and/or incidents, which uses adaptive indexes 190 to index network data logs 120, according to some embodiments.

As shown in the figure, a network monitoring service 630 is configured to monitor the client network 600 over one or more networks 620. The network monitoring service 630 implements the adaptive indexing system 140 of FIG. 1 as part of a database service 650. The database service 650 is a log repository that is used to hold network data logs 120 collected from the client network 600. The client network 600 may be one of many client networks monitored by the network monitoring service 630, which may include private networks (including cloud-hosted virtual private networks) operated by different groups, organizations, companies, or other types of entities that are customers of the network monitoring service 630.

In some embodiments, the network monitoring service 630 may be operated as part of a managed detection and response (MDR) service, and may implement a security information and event management (SIEM) system. In some embodiments, the network monitoring service 630 enables monitoring of the client network 600 by security analysts working from a control center 622 (e.g. network operations center or security operations center), which may be at a different geographical location than the client network 600 or at the premises of the client network 600. Security analysts at the security operations center 622 may work from analyst workstations or consoles 624 that implement an alert interface 626 and a configuration interface 530. The alert interface 530 may be configured to present security events detected in the client network 600 to the security analyst. The configuration interface 530 may allow security analysts or other users to modify configuration settings of the network monitoring service, including configuration settings pertaining to the adaptive indexing system.

In various embodiments, the network(s) 620 may encompass any suitable combination of networking hardware and protocols necessary to establish communications between the client networks 600 and the network monitoring service 630. In some embodiments, the machines 610a-d may execute in a private network of a company, behind a company firewall, and the network 620 may include a public network such as the Internet, which lies outside the firewall. The network 620 may encompass the different telecommunications networks and service providers that collectively implement the Internet. In some embodiments, the network 620 may also include private networks such as private local area networks (LANs), private wide area networks (WANs), or private wireless networks. The network 620 may be implemented using different hardware (e.g., modems, routers, switches, load balancers, proxy servers, etc.) and software (e.g., protocol stacks, firewall/security software, etc.) for establishing networking links between the client networks 600 and the network monitoring service 630. As shown, agents 612a-d may be deployed on the machines 610 to aid the operations of the network monitoring service 630, for example, to collect observation data from the client network 600 or carry out configuration change actions on the machines 610.

As shown, the client network 600 can include different types of computing resources, such as a workstation 610a, a server 610b, a mobile device 610c, and a virtual machine 610*d*. Each of these types of machines may be a machine monitored by the network monitoring service 630. The virtual machine 610*d* may be an instance of a compute resource that is emulated and hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER and KUBERNETES. As may be appreciated, the machines 610 may include a variety of other types of computing systems, including embedded systems, networking devices, storage devices, Internet-of-Things (IoT) devices, vehicles, and the like.

As shown, the network monitoring service 630 may include a number of independently executing microservices, which are implemented on the resources 690 provided by the cloud service provider. For example, a network data logging service 640 may be used to implement a network data collection interface to interact with the agents 612, receive collected data streams from the client networks 600, and persist this data in the form of event logs in the database service 650. The adaptive indexing system 140 discussed in connection with FIG. 1 may be implemented as part of the database 650, and will automatically adjust the adaptive indexes 190 based on collected query statistics 150 of the network data logs 120.

As shown, the network monitoring service 630 implements one or more assessment services 660. The assessment service 660 may be configured to perform a variety of assessments of the client network 600 based on the network data logs 120, and generate different types of security events to the analyst console 624. The assessments may involve looking for signs of a cyberattack or malware, vulnerabilities to attacks, conditions that represent a type of threat, misconfigurations in the client network, suspicious or inappropriate user behavior in the client network, suspicious network or machine activities, network policy violations, and various other types of event signals. Security events may be raised in response to conditions such as the detection of malware signatures, missing application patches, suspicious network traffic patterns, suspicious emails, among other things. The assessment service 660 may monitor for and these conditions continuously over time and report security events or provide more detailed assessment reports. In some embodiments, output of the assessment service 660 may be written to the database service 650 as an additional layer of data.

In some embodiments, the network data logs 120 may be stored separately for each client and or client network 600 monitored by the network monitoring service 630. A separate database instance may be instantiated for each client's network data logs 120 to maintain security isolation among clients. Types of network data logs 120 collected by the network monitoring system 230 may include perimeter device logs (e.g. firewall or intrusion detection system logs), machine event logs (e.g. WINDOWS system logs, DNS server logs, directory service logs), application logs (e.g. email activity logs), network logs (e.g. traffic data collected from network devices in the network), among others.

A query 110 to a network data logs 120 may search for a particular external IP address that endpoints in the network has connected to, a signature of a particular web request, uniform resource locator (URL), or email that is known to be associated with an attack, or a hash ID or signature of a WINDOWS process or file associated with known malware, just to list a few examples. The queries may be performed by software components of the assessments services 660 or by human analysts via the analyst console 624. As may be appreciated, the types of queries that are made to the network data logs 120 may vary over time, for example, when new types of attacks or exploits are discovered. The adaptive indexing system 140 allows the indexes of the database service 650 to quickly react to these changing querying patterns, so that the indexes 190 can quickly adjust to new query keys (e.g. new malicious IP addresses or malware signatures).

In some embodiments, the querying statistics 150 observed for one client network may be used to adjust the indexes 190 of the log data for another client network. This way, when a novel security issue is discovered in one client network (which may propagate to other client networks), the indexes of all other client networks can be prepared for anticipated queries directed to that security issue.

In some embodiments, another type of input used by the adaptive indexing system 140 to adjust the indexed keys is data from a security vulnerability database 670 (e.g. the Common Vulnerability and Exposures (CVE) database), which publishes information about known cybersecurity vulnerabilities. As one example, when a new vulnerability is discovered, the security vulnerability database 670 may quickly publish a detection technique (e.g. an attack signature) for the vulnerability. Embodiments of the adaptive indexing system 140 may monitor the security vulnerability database 670 and proactively adjust the indexes 190 to prepare for queries that use the new detection technique. This proactive adjustment may be automatically performed before the observation of any queries that use the detection technique. In some embodiments, the adaptive indexing system 140 may also provide a user interface that allows users to explicitly modify the indexed key set (e.g. add or remove query keys for the index). These manual changes to the index may be based on information about known sources of future queries available to the user, such as dashboard cards or other user's saved queries in the system.

As shown, the network monitoring service 630 may be implemented in a cloud service provider environment using infrastructure or resources 690 provided by the cloud service provider. In some embodiments, the network monitoring service 630 may be configured as one or more web services that receives web services requests formatted as JSON documents. The network monitoring service 630 may support REST-style or document-based (e.g., SOAP-based) types of web services requests. The network monitoring service 630 may implement service interfaces using other types of remote procedure calling protocols, such as GOOGLE PROTOCOL BUFFERS or PROTOBUF. The cloud service provider network may provide hardware and/or software to implement service endpoints so that a request directed to that endpoint is properly received and processed.

As shown, the cloud service provider resources 690 may include different types of computing resources 692 (e.g. virtual machine instances or container instances), which can be leased by service customers to implement custom hosted services. As shown, the cloud service provider may provide resource services to host resources for its tenants, such as compute resource services 692, storage services 694, networking services 696, orchestration services 698, and resource metrics services 699. The services of the network monitoring service 630 may be built using these underlying resource services provided by the cloud service provider. In some embodiments, the cloud service provider resources 690 may implement features such as load balancing of incoming service requests and/or dynamic management and scaling of resource pools. In some embodiments, the cloud service provider may be a provider such as AMAZON WEB SERVICES or MICROSOFT AZURE.

FIG. 7 is a flowchart illustrating a process performed by a data storage system 100 to manage and use an adaptive index 190, according to some embodiments.

The process begins at operation 710, where an index (e.g. adaptive index 190) is maintained for a data store (e.g. for a data object 120 or a fragment 230 of the data object), which is used to reduce search time for a set of indexed query keys (e.g. indexed key set 192) during execution of queries. In some embodiments, the index may comprise a number of search data structures 240 that correspond to different fragments of the data, and each search data structure can be evaluated to determine whether its corresponding fragment contains data that matches individual query keys in the indexed key set. In some embodiments, the search data structure may be implemented as a deterministic data structure such as a hash table or hash map.

At operation 720, the system tracks query statistics (e.g. query statistics 150) observed for queries directed to the data store. The query statistics indicate usage levels of different query keys observed in the queries. In some embodiments, the query statistics may be stored in a time series database, where the query statistics are grouped into time intervals (e.g. hourly, daily, weekly). The query statistics in the time series database may include different types of metrics such as observations counts of different query keys, observation frequencies, a percentage or share of queries that used a query key, usage rankings of query keys, and the like. In some embodiments, the query statistics may also include a usage cost for each observed query key, such as the amount of time used to evaluate the query key during query executions or the amount or percentage of data searched using the query key. The query key's usage level for a time interval may be calculated as a metric that is dependent on both its observed count and/or frequency and its observed usage cost. In some embodiments, the query statistics may indicate a detected change in the historical pattern of a particular query key or category of query keys. In some embodiments, the query statistics may be tracked for individual fragments of the dataset, so that the adaptive indexing system can make adaptation decisions on a per-fragment basis.

At operation 730, the system determines, based on the query statistics, that a particular query key satisfies a key selection criterion (e.g. criterion 162) to be added to the set of indexed query keys. For example, the system may determine that the usage level of the query key exceeds a configured threshold, or that the query key has become one of a number of top ranked key in terms of its usage.

As a result of operation 730, at operation 740, the system dynamically adds the query key to the set of indexed query keys of the index. The addition of the query key may be performed regularly based on a configured period, or immediately when a threshold condition is satisfied. In some embodiments, the addition may be scheduled to be performed in a future maintenance window of the data store, when data store activity is expected to be low or ceased.

In some embodiments, the dynamic adjustment to the indexed key set may be accompanied by a reindexing operation (e.g. reindexing operation 180), which updates the index for existing data in the data store, according to the adjusted index key set. The reindexing enables queries on the existing data to take advantage of the added query key in the index, so that search time for subsequent queries is reduced.

At operation 750, the system determines, based on the query statistics, that a second query key satisfies a key removal criterion to be removed from the set of indexed query keys. In some embodiments, the key removal criterion may simply be the opposite as the key selection criterion to add a key to the indexed key set. At operation 760, as a result of operation 750, the second query key is dynamically removed from the indexed key set, so that the size of the index is reduced (at least for the index going forward). In some embodiments, the removal criterion may be evaluated when a query key needs to be evicted from the indexed key set due to index size constraints. In some embodiments, all keys in the indexed key set are designated with a lifetime, so that when the lifetime expires, the key is automatically removed from the indexed key set.

As shown, index adjustments and reindexing of operations 730, 740, 750, and 760 may occur repeated, so that the indexed key set of the index continuously adapts to the changing query statistics to keep an optimal set of indexed query keys in terms of expected usage and index size.

FIG. 8 is a flowchart illustrating a process performed by a time-sequenced data store that uses an adaptive index 190 to selectively index data in a time-sequenced dataset (e.g. time-sequence data object 310), according to some embodiments.

At operation 810, an index (e.g. adaptive index 190) is maintained for time-sequenced records in a log store. In some embodiments, the log store may store different types of event logs for network data collected from client networks 600. As discussed in connection with FIG. 3, the log store may store the records in sequential data portions (e.g. fragments 320), creating new data portions when needed.

At operation 820, the system maintains, in a time series database, query statistics for observed queries directed to the log store over time. Operation 820 may be performed in a similar manner as discussed in connection with operation 720.

At operation 830, the system (e.g. a dynamic controller) determines to create a new data portion (e.g. fragment 320d). When operation 830 occurs, at operation 840, the system dynamically adjusts the indexed key set of the index based on the query statistics, for example adding or removing query keys from the index key set as appropriate. Thus, in this embodiment, adjustments to the indexed key set are performed at the time each new portion is created. Moreover, in this embodiment, the adjusted indexed key set is not applied to all previous data portions in the log store. Rather, the adjustment is only applied to the newly created portion and possibly a subset of the previous portions.

Operation 850 may occur at the same time as operation 840. At operation 850, the system determines, based on the query statistics, a time window of previous data portions in the log store (e.g. window 350) to reindex using the adjusted index key set. For example, the reindexing may be limited to a set of most recent fragments where one or more newly added query keys were observed. The reindexing operation is then dynamically performed on the selected time window in operation 860. As may be appreciated, this selective reindexing approach limits the expensive reindexing operation to a small portion of the data, is particularly well-suited for time-based datasets where the querying is expected to focus on just new data and a small portion of the most recent data.

Figure 9:
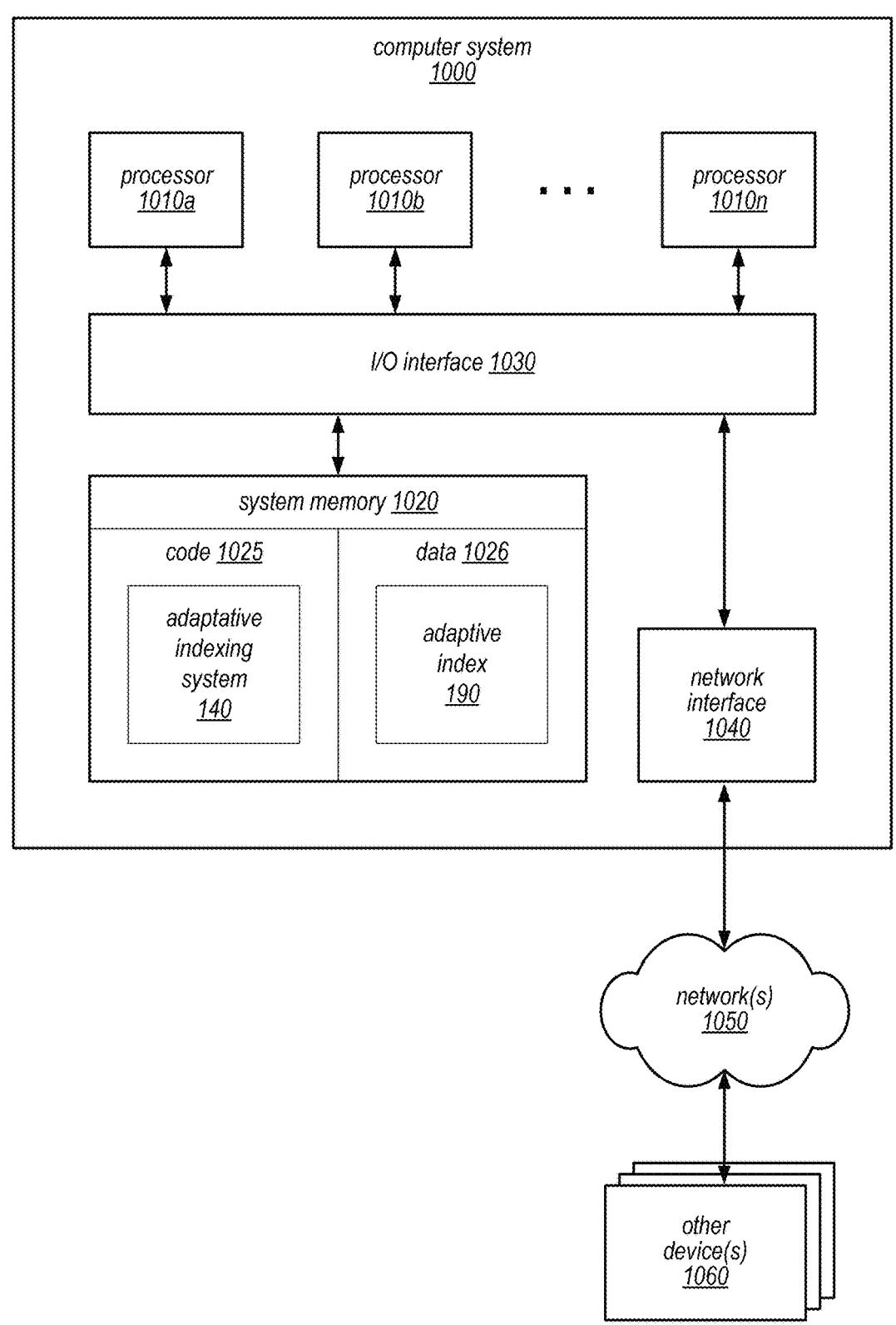
FIG. 9 is a block diagram illustrating an example computer system that can be used to implement one or more portions of an adaptive indexing system, according to some embodiments.

FIG. 9 is a block diagram illustrating an example computer system 1000 that can be used to implement one or more portions of an adaptive indexing system 140, according to some embodiments. The computer system 1000 may be one or more servers that implements one or more components of the data storage system 100 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of the adaptive indexing system 140, as discussed in connection with FIG. 1. The system memory 1320 may also be used to store data 1026 needed by the executable instructions. For example, the in-memory data 1026 may be used to store portions of the adaptive index 190, as discussed in connection with FIG. 1.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method comprising:

performing, by one or more computers that implement an adaptive indexing system of a data store:

maintaining an index for the data store used to reduce search time of the data store for a set of indexed query keys;

storing query statistics for observed queries directed to the data store, wherein the query statistics indicates a usage rank of different query keys in the observed queries over a time period;

determining, based on the query statistics, that a query key is one of a number of top ranked query keys according to the usage rank and satisfies a key selection criterion to be included in the set of indexed query keys, and in response:

dynamically adding the query key to the set of indexed query keys of the index, so that search time for the query key during execution of subsequent queries of the data store is reduced.

2. The method of claim 1, further comprising the adaptive indexing system:

determining, based on the query statistics, that a second query key satisfies a key removal criterion to be removed from the set of indexed query keys, and in response:

dynamically removing the second query key from the set of indexed query keys of the index, wherein the removal reduces a size of the index.

3. The method of claim 1, wherein:

dynamically adding the query key to the set of indexed query keys causes a reindexing operation to be performed to update the index for the query key; and the method further comprises the adaptive indexing system repeatedly modifying the set of indexed query keys and performing reindexing operations to continuously adapt the index to changes in the query statistics.

4. The method of claim 1, wherein:

the data store stores data in a plurality of fragments;

the index comprises search data structures for respective ones of the fragments, wherein a search data structure indicates whether a fragment stores data that matches a particular query key; and during execution of a query that specifies the particular query key, the fragment is not searched when the search data structure indicates that the fragment does not store data that matches the particular query key.

5. The method of claim 1, wherein:

the key selection criterion is specified via a configuration interface of the adaptive indexing system; and wherein the key selection criterion is based on a configured size limit of the index.

6. The method of claim 1, wherein the key selection criterion is based on one or more of:

a count or frequency of the particular query key; and a percentage of queries that used the particular query key.

7. The method of claim 1, wherein the key selection criterion is based on a detected change in a query pattern indicated in the query statistics.

8. The method of claim 1, wherein:

the data store is one a plurality of client data stores that store data of different clients; and the key selection criterion is based on query statistics observed for another one of the plurality of client data stores.

9. The method of claim 1, wherein:

data in the data store includes a plurality of data fields and a plurality of corresponding data values; and the query key specifies a particular data field and a particular data value specified by one or more observed queries.

10. The method of claim 9, further comprising the adaptive indexing system:

adding a second query key to the set of indexed query keys of the index, wherein the second query key specifies a query predicate specified by an observed query.

11. The method of claim 9, further comprising the adaptive indexing system:

in response to determining that the query key satisfies a key selection criterion to be included in the set of indexed query keys:

determining, based on the query statistics, a set of highest ranked queried data values associated with the particular data field specified by the query key; and adding a set of additional query keys to the set of indexed query keys, wherein the additional query keys specify the particular data field and different ones of the set of highest ranked queried data values.

12. A system comprising:

one or more computers that implement an adaptive indexing system of a data store, configured to:

maintain an index for the data store used to reduce a search time of the data store for a set of indexed query keys;

store query statistics for observed queries directed to the data store, wherein the query statistics indicates a usage rank of different query keys in the observed queries over a time period;

determine, based on the query statistics, that a query key is one of a number of top ranked query keys according to the usage rank and satisfies a key selection criterion to be included in the set of indexed query keys, and in response:

dynamically add the query key to the set of indexed query keys of the index, so that search time for the query key during subsequent queries of the data store is reduced.

13. The system of claim 12, wherein the addition of the query key to the set of indexed query keys causes a reindexing operation to be performed to update the index for the query key.

14. The system of claim 13, wherein:

the data store stores data in a plurality of fragments;

the index comprises search data structures for respective ones of the fragments, wherein a search data structure indicates whether a fragment stores data that matches the query key; and the reindexing operation updates search data structures for a subset of the fragments, wherein the subset is selected based on the query statistics.

15. The system of claim 13, wherein the adaptive indexing system is configured to:

repeatedly modify the set of indexed query keys and perform reindexing operations to continuously adapt the index to changes in the query statistics.

16. The system of claim 12, wherein the key selection criterion is based on one or more of:

a count or frequency of the particular query key; and a percentage of queries that used the particular query key.

17. The system of claim 12, wherein the key selection criterion is based on a detected change in a query pattern indicated in the query statistics.

18. The system of claim 12, wherein:

data in the data store includes a plurality of data fields and a plurality of corresponding data values; and the query key specifies a particular data field and a particular data value specified by a previous query.

19. The system of claim 12, wherein:

the index comprises a plurality of search data structures; and a search data structure includes a hash map that indicates whether or not different query keys match data in a fragment of the data store.

20. The system of claim 12, wherein:

the data store is part of a network monitoring service and stores a log of timestamped events observed in a monitored computer network; and the network monitoring service queries the data store to assess the monitored computer network for indications of security threats, security policy violations, or security incidents.

\* \* \* \* \*